No. 797,814. PATENTED AUG. 22, 1905.
E. MIMARD.
DRIVING MEANS FOR VEHICLES.
APPLICATION FILED JULY 27, 1904.

2 SHEETS—SHEET 1.

WITNESSES

INVENTOR
Etienne Mimard

ATTORNEYS

No. 797,814. PATENTED AUG. 22, 1905.
E. MIMARD.
DRIVING MEANS FOR VEHICLES.
APPLICATION FILED JULY 27, 1904.

2 SHEETS—SHEET 2.

WITNESSES
M. H. Woodruff
Walter Abbe

INVENTOR
Etienne Mimard
BY
Howson and Howson
ATTORNEYS

UNITED STATES PATENT OFFICE.

ETIENNE MIMARD, OF ST. ETIENNE, FRANCE.

DRIVING MEANS FOR VEHICLES.

No. 797,814.  Specification of Letters Patent.  Patented Aug. 22, 1905.

Application filed July 27, 1904. Serial No. 218,425.

*To all whom it may concern:*

Be it known that I, ETIENNE MIMARD, a citizen of the Republic of France, and a resident of St. Etienne, France, have invented an Improvement in Driving Means for Vehicles, of which the following is a specification.

The object of this invention is to provide an improved driving means for vehicles which will enable the mere reversal of direction of rotation of the driving-shaft to effect a change of gear between the driving and driven shaft without change of direction of the vehicle's motion.

Figure 1:
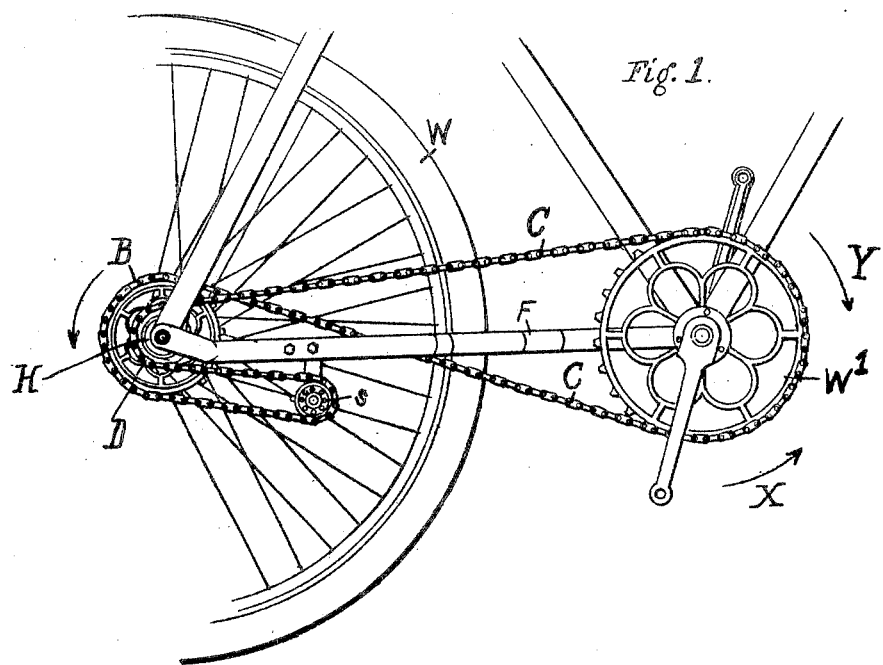
Figure 3:
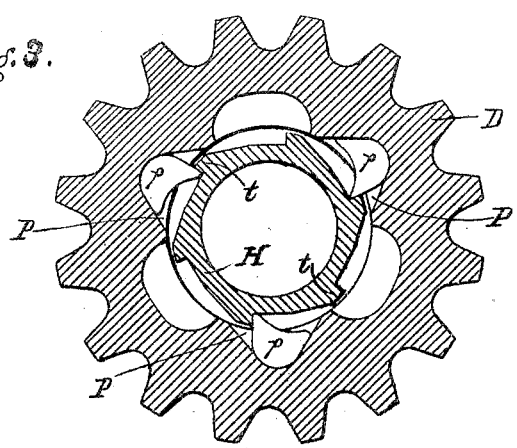
Figure 2:
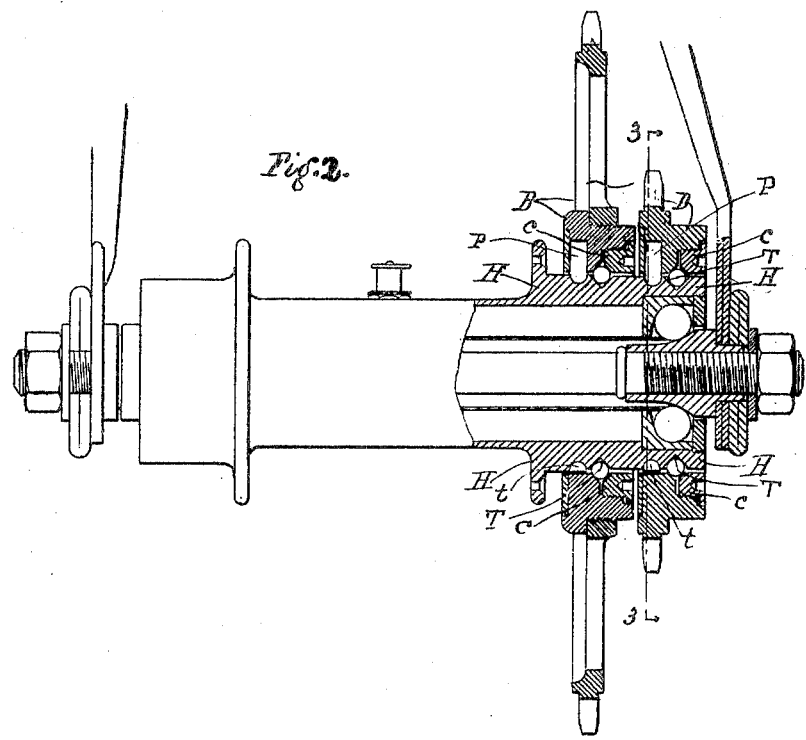

In the accompanying drawings, Figure 1 is a partial side elevation of a bicycle provided with my invention. Fig. 2 is a detail of the rear hub and sprockets, partly in section; and Fig. 3 is a sectional view on the line 3 3, Fig. 2.

As shown in Fig. 1, F is a bicycle-frame, and W the driven wheel, having a hub or shaft H, on which are mounted two sprocket-wheels B and D of different diameters. Each sprocket B and D is adapted to rotate freely in the direction of the arrow without affecting the hub of the driven wheel, and when either of them is rotated in a contrary direction (clockwise in this instance) the sprocket so rotating will be caused to grip the hub and rotate the wheel W clockwise. In operation these wheels turn in contrary directions.

A driving sprocket-wheel W' is provided, as usual, and an idler-sprocket *s* is hung from the lower forks of the wheel or otherwise conveniently located. An endless chain C is passed over the driving-wheel W', the upper reach of which passes over the top of the driven sprocket D, continuing on over the idler-sprocket *s*, returning and passing upwardly around the driven sprocket B, then crossing the upper reach of the chain and passing below and around the driving-sprocket.

While I have illustrated and described the invention particularly with reference to bicycles provided with driving-chains, nevertheless I wish it understood that any type of vehicle having a driving-shaft may be fitted with this invention and an endless chain, belt, or equivalent used without departing from the spirit of my invention.

In operation with relation to the device of Fig. 1 should the operator desire speed he pedals in the direction of the arrow Y, rotating the smaller-diameter driven spocket D clockwise to cause it to clutch and turn the wheel W. The chain is drawn over the idler-sprocket *s*, passing around the larger sprocket B, which turns in the direction pointed out by the arrow, Fig. 1, and does not clutch the hub. Should the operator wish to decrease the effort applied to the pedals, (of course with an attendant decrease of speed,) he reverses the direction of rotation of the wheel W', rotating it now in the direction of the arrow X. Thus he draws the lower reach of the chain C forward, causing the wheel B to rotate clockwise to grip and rotate the hub H of the wheel W, while the upper reach of the chain passes rearwardly, rotating the sprocket D contra-clockwise and free from all influence on the hub.

As shown in Figs. 2 and 3, the hub H is provided with two sets of ratchet-teeth *t* and adjacent ball-races T. The sprockets D and B fit against the balls in the races and are held in position thereon by collars *c c*. Pockets P in the recesses in the sprocket-wheels B D contain the pawls *p*. The sets of teeth *t* on the hub are reversed in pitch, so that but one set at a time may be engaged by its pawls.

It will be seen that the driving, driven, and idler shafts are all parallel and that the sprockets are all in the same or substantially parallel planes. This is of course necessary to minimize the transverse space taken up by the mechanism.

I claim as my invention—

A change-speed gear, comprising a driven shaft, two sprockets thereon of different diameters, both turning free of the driven shaft in the same direction, and adapted to grip it when they turn in the opposite direction, an idler-sprocket, a driving-sprocket and a crossed endless chain from the driving-sprocket over both of said two sprockets, and chain passing around the idler-sprocket as it comes from said two sprockets, all said sprockets being in the same and parallel planes.

In testimony whereof I have signed my name to this specification in the presence of two subscribing witnesses.

ETIENNE MIMARD.

Witnesses:
 GABRIEL DUCLOS,
 EUGENE CASSINI.